United States Patent
Kawashima et al.

(10) Patent No.: US 6,992,960 B2
(45) Date of Patent: *Jan. 31, 2006

(54) RECORDING APPARATUS AND RECORDING METHOD

(75) Inventors: Tetsuji Kawashima, Kanagawa (JP); Yukio Shishido, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/113,848

(22) Filed: Apr. 25, 2005

(65) Prior Publication Data

US 2005/0195714 A1    Sep. 8, 2005

Related U.S. Application Data

(63) Continuation of application No. 09/907,216, filed on Jul. 17, 2001, now Pat. No. 6,904,008.

(30) Foreign Application Priority Data

Jul. 19, 2000  (JP) .......................... P2000-223891

(51) Int. Cl.
   G11B 5/09   (2006.01)
   G11B 7/00   (2006.01)
(52) U.S. Cl. ............... 369/53.22; 369/53.2; 369/53.23; 369/53.45; 369/47.39; 369/44.28; 369/124.01

(58) Field of Classification Search ..................... None
See application file for complete search history.

(56) References Cited

U.S. PATENT DOCUMENTS

| | | | |
|---|---|---|---|
| 6,608,804 B2 * | 8/2003 | Shim ........................ | 369/53.22 |
| 6,747,931 B1 * | 6/2004 | Park ......................... | 369/53.23 |
| 6,760,289 B1 * | 7/2004 | Ide ........................... | 369/53.2 |
| 6,931,654 B1 * | 8/2005 | Oh et al. .................. | 369/13.02 |

* cited by examiner

*Primary Examiner*—Muhammad Edun
(74) *Attorney, Agent, or Firm*—Jay H. Maioli

(57) ABSTRACT

The amount of light reflected from a disk is detected, and it is determined according to the amount of reflected light whether the disk is a recordable disk or a rewritable disk. The disk is controlled according to the result of determination such that it is rotated at a constant angular velocity (CAV) or at a constant linear velocity (CLV) and recording is executed. Further, rotation driving control of the disk is selected according to factors other than the type of the disk, such as according to whether random recording is allowed or not, according to a recording state in the disk, according to whether an alternative area is provided or not, according to a recording start position, or according to whether initialization is required or not. CLV control or CAV control is appropriately selected for a disk at recording to suppress a reduction in accessibility and a reduction in data transmission rate.

1 Claim, 14 Drawing Sheets

FIG. 2
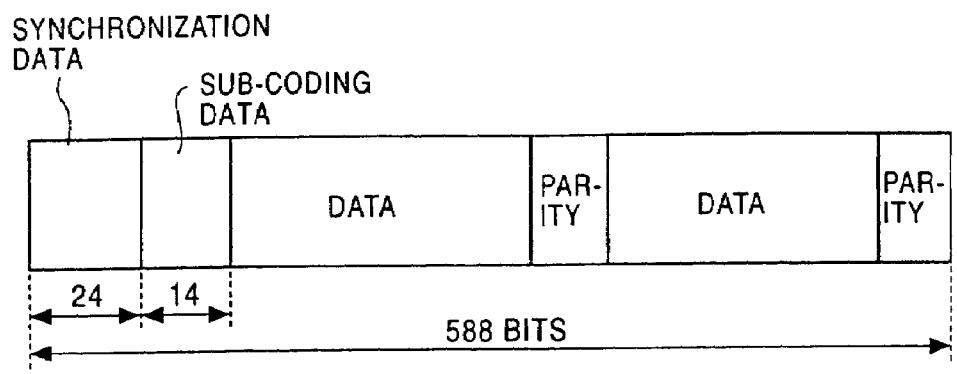
FIG. 3A
| FRAME | SUB-CODING FRAME |
|---|---|
| 98n + 1 | SYNCHRONIZATION PATTERN |
| 98n + 2 | SYNCHRONIZATION PATTERN |
| 98n + 3 | P1  Q1  R1  S1  T1  U1  V1  W1 |
| 98n + 4 | P2  Q2  R2  S2  T2  U2  V2  W2 |
| ⋮ | ⋮ |
| 98n + 97 | P95 Q95 R95 S95 T95 U95 V95 W95 |
| 98n + 98 | P96 Q96 R96 S96 T96 U96 V96 W96 |
| 98(n+1) + 1 | |
FIG. 3B
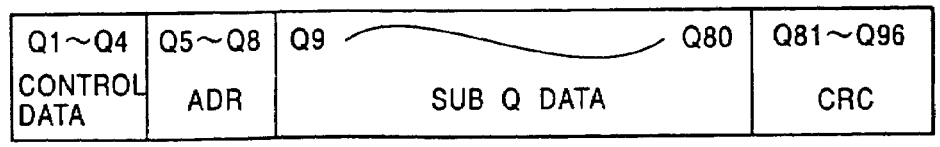

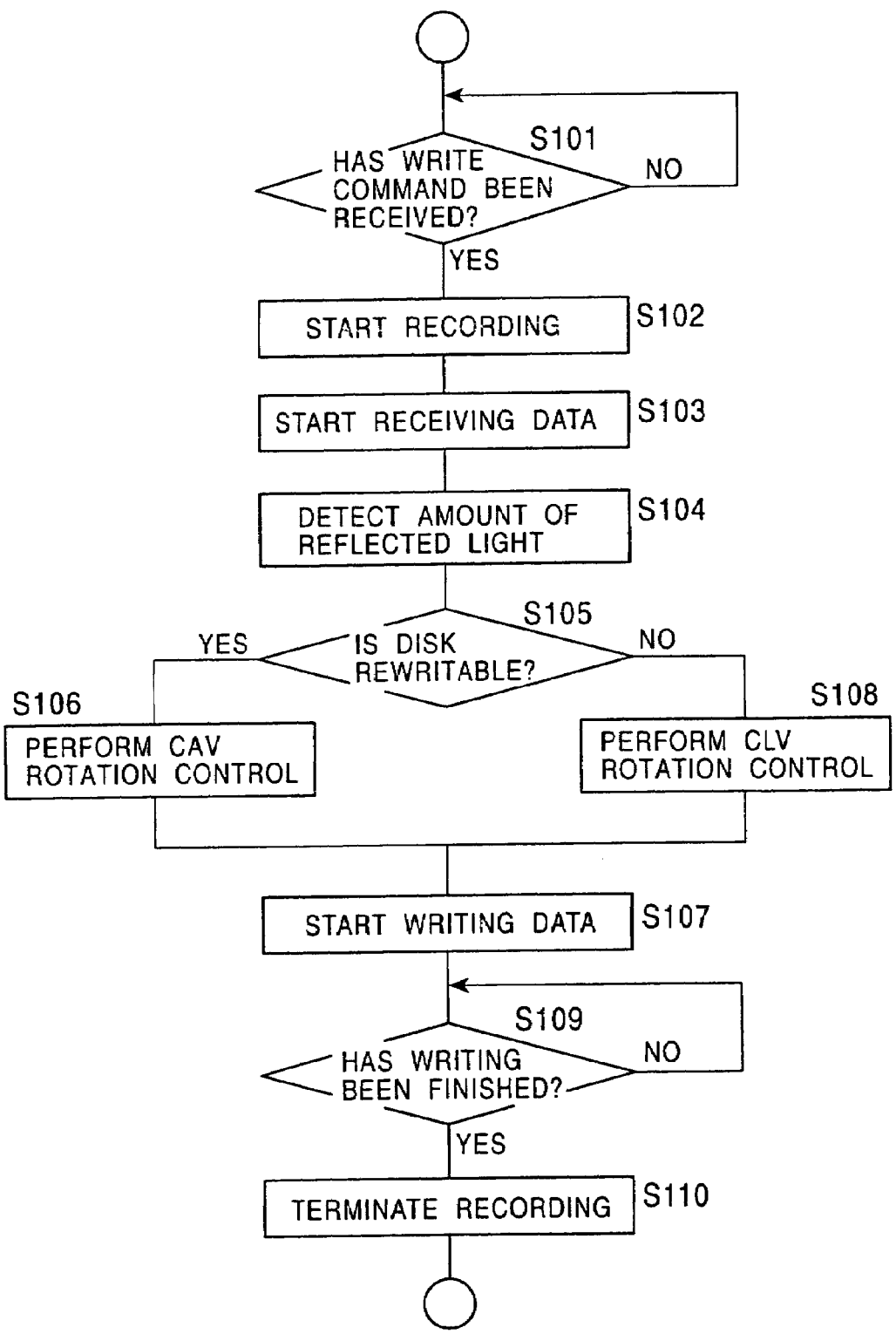

FIG. 8

| LBA | Descriptor | Structure |
|---|---|---|
| 0 to 15 | Reserved (all 00h bytes) | |
| 16 | Primary Volume Descriptor (ISO 9660) | UDF Bridge Volume Recognition Sequence |
| 17 | Volume Descriptor Set Terminator | |
| 18 | Beginning Extended Area Descriptor | |
| 19 | NSR Descriptor | |
| 20 | Terminating Extended Area Descriptor | |
| 21 to 31 | Reserved (all 00h bytes) | |
| 32 | Primary Volume Descriptor (UDF) | Main Volume Descriptor Sequence |
| 33 | Implementation Use Volume Descriptor | |
| 34 | Partition Descriptor | |
| 35 | Logical Volume Descriptor | |
| 36 | Unallocated Space Descriptor | |
| 37 | Terminating Descriptor | |
| 38 to 47 | Trailing Logical Sectors (all 00h bytes) | |
| 48 | Primary Volume Descriptor (UDF) | Reserve Volume Descriptor Sequence |
| 49 | Implementation Use Volume Descriptor | |
| 50 | Partition Descriptor | |
| 51 | Logical Volume Descriptor | |
| 52 | Unallocated Space Descriptor | |
| 53 | Terminating Descriptor | |
| 54 to 63 | Trailing Logical Sectors (all 00h bytes) | |
| 64 | Logical Volume Integrity Descriptor | Logical Volume Integrity Sequence |
| 65 | Terminating Descriptor | |
| 66 to 255 | Reserved (all 00h bytes) | |
| 256 | Anchor Volume Descriptor Pointer | First Anchor Point |
| 257 to p-1 | Path Table/Directory Record | ISO 9660 File Structure |
| p to p+q-1 | File Set Descriptor/Terminating Descriptor File Identifier Descriptor/File Entry | UDF File Structure |
| p+q to Last LSN 1 | UDF/ISO 9660 Files | File Data Structure |
| Last LSN | Anchor Volume Descriptor Pointer | Second Anchor Point |

VOLUME SPACE

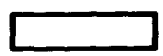 : UDF Bridge Structure

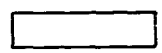 : CD-ROM Volume Descriptor Set

FIG. 11

| Byte/Bit | 7 | 6 | 5 | 4 | 3 | 2 | 1 | 0 |
|---|---|---|---|---|---|---|---|---|
| 0 | colspan=8 | 54h (ASCII "T") |
| 1 | 44h (ASCII "D") ||||||||
| 2 | 49h (ASCII "I") ||||||||
| 3 | Pre Gap Length encoded BCD ||||||||
| 4 | ||||||||
| 5 | Reserved |||||| | Current |
| 6 | Lowest Track Number Listed (BCD) ||||||||
| 7 | Highest Track Number Listed (BCD) ||||||||
| 8 | Track Number (BCD) ||||||||
| 9 | Rcording method ||||||||
| 10 | (MSB) |||||||  |
| 11 | Fixed Packet Size in blocks (BCD) ||||||||
| 12 | |||||||  (LSB) |
| 13–2047 | Reserved ||||||||

TDT: bytes 0–7
TDU: bytes 8–2047

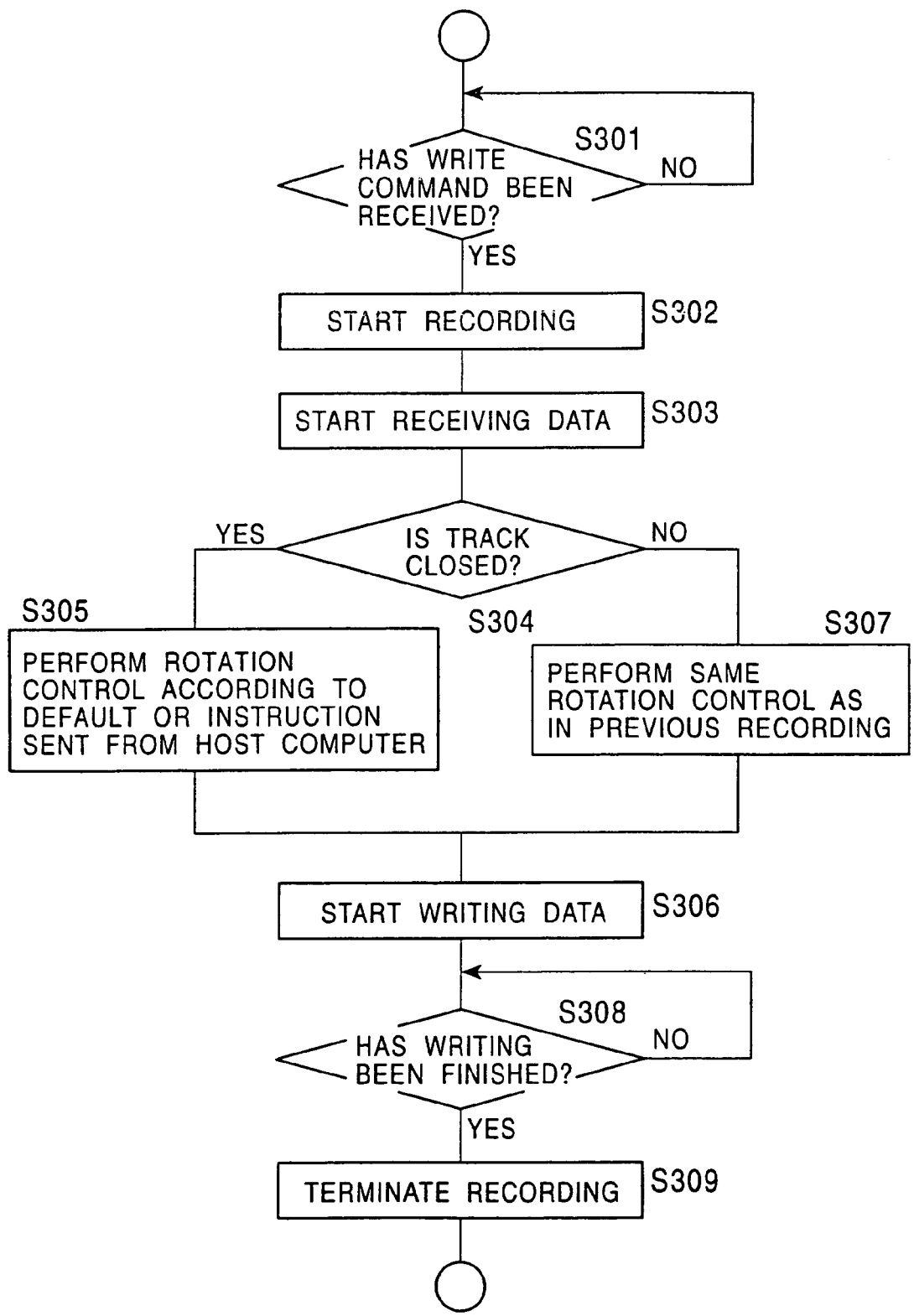

| PDL ENTRY COUNT |
|---|
| dfap1 |
| dfap2 |
| dfap3 |
| dfap4 |
| ⋮ |

| SDL ENTRY COUNT | |
|---|---|
| dfas1 | rpa1 |
| dfas2 | rpa2 |
| dfas3 | rpa3 |
| dfas4 | rpa4 |
| ⋮ | ⋮ |

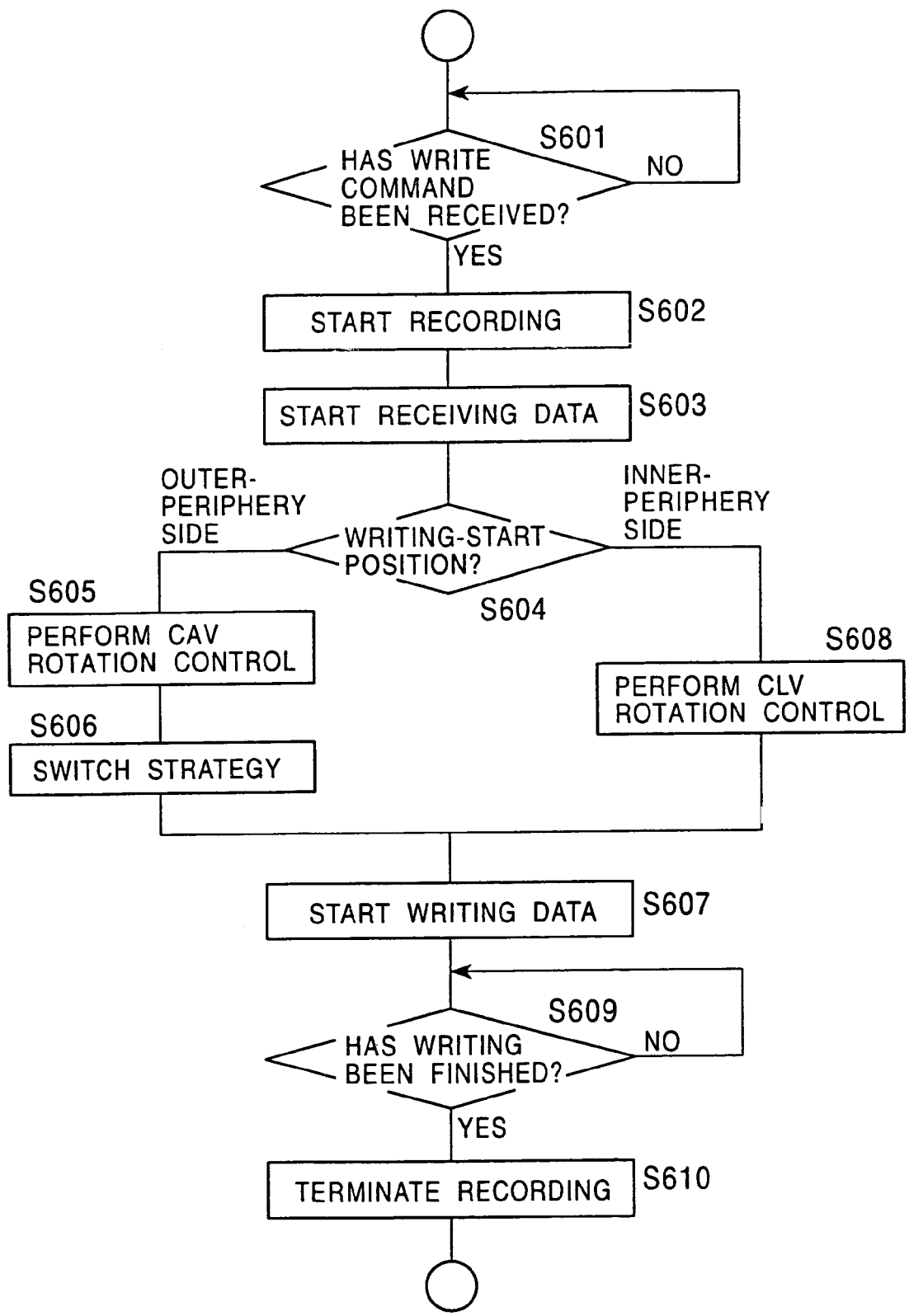

RECORDING APPARATUS AND RECORDING METHOD

This is a continuation of prior application Ser. No. 09/907,216 filed Jul. 17, 2001 now U.S. Pat. No. 6,904,008.

BACKGROUND OF THE INVENTION

1. Field of the Invention

The present invention relates to recording apparatuses and recording methods related to disk rotation control, for example, in a case in which data is recorded into an optical disk.

2. Description of the Related Art

In these years, recordable optical disks such as compact disc recordables (CD-Rs) and rewritable optical disks such as compact disc rewritables (CD-RWs) have been spread. For these recordable optical disks (hereinafter called disks), recording methods, such as a packet-write method, a track-at-once method, a session-at-once method, and a disk-at-once method, are selected. Disks are rotated by constant-linear-velocity (CLV) control, in which a linear velocity is made constant, so that recording is performed at a constant linear velocity even at the inner-periphery side and the outer-periphery side of a recording area.

As disk driving control other than CLV control, there is also known constant-angular-velocity (CAV) control, in which an angular velocity is made constant.

Since a constant linear velocity is maintained in CLV control, recording can be performed in any position on a disk at the same data transmission rate. To this end, however, rotation driving control needs to be applied so as to obtain the rotation speed corresponding to a radial position on the disk. It takes time to change the number of revolutions. Therefore, when recording is performed with random access, for example, the number of revolutions needs to be changed in some cases and a long period elapses from the start of recording to the end.

In CAV control, since a constant rotation speed is maintained irrespective of a radial position on the disk, better accessibility is provided than in CLV control, but a recording speed is different depending on a recording position (the outer-periphery side or the inner-periphery side). Therefore, a data transmission rate is lower when recording is performed at the inner-periphery side than when recording is performed at the outer-periphery side.

It is demanded that an efficient recording operation be performed by selecting CLV control or CAV control according to the purpose of recording.

SUMMARY OF THE INVENTION

The present invention has been made in consideration of the foregoing conditions. It is an object of the present invention to provide a recording apparatus and a recording method which appropriately select constant-linear-velocity control or constant-angular-velocity control to suppress a reduction in accessibility and a reduction in data transfer rate.

The foregoing object is achieved in one aspect of the present invention through the provision of a recording apparatus including laser-light emitting means for emitting laser light to a loaded disk; detecting means for detecting light reflected from the disk; driving means for rotating the disk; determination means for determining the type of the loaded disk; driving control means for controlling the driving means according to the result of determination performed by the determination means, so as to perform rotation driving at a constant angular velocity or at a constant linear velocity; and recording control means for executing recording for the disk in a state in which the driving control means performs rotation driving control.

The foregoing object is achieved in another aspect of the present invention through the provision of a recording apparatus including reading means for reading data from a loaded disk; determining means for determining the type of recording from data recorded into the disk, according to the reading output of the reading means; driving means for rotating the disk; driving control means for controlling the disk according to the determination output of the determination means so as to perform rotation driving at a constant angular velocity or at a constant linear velocity; and recording control means for executing recording for the disk in a state in which the driving control means performs rotation driving control.

The foregoing object is achieved in still another aspect of the present invention through the provision of a recording apparatus including reading means for reading data from a loaded disk; detecting means for detecting substituted-area-identification information indicating whether a substituted area is used in the disk, according to the reading output of the reading means; driving means for rotating the disk; driving control means for controlling the driving means according to the substituted-area-identification information so as to perform rotation driving at a constant angular velocity or at a constant linear velocity; and recording control means for executing recording for the disk in a state in which the driving control means performs rotation driving control.

The foregoing object is achieved in yet another aspect of the present invention through the provision of a recording apparatus including input means for inputting at least a recording command from the outside; driving means for rotating the disk; determination means for determining whether initialization is required for a loaded disk, when the recording command is input; and driving control means for controlling the driving means according to the result of determination performed by the determination means, so as to perform rotation driving at a constant angular velocity or at a constant linear velocity.

The foregoing object is achieved in a further aspect of the present invention through the provision of a recording apparatus including reading means for reading data from a loaded disk; detecting means for detecting recording-start-position information according to data read by the reading means; driving means for rotating the disk; driving control means for controlling the driving means according to the recording-start-position information so as to perform rotation driving at a constant angular velocity or at a constant linear velocity; and recording control means for executing recording for the disk in a state in which the driving control means performs rotation driving control.

The foregoing object is achieved in a still further aspect of the present invention through the provision of a recording method including a determination step of determining the type of a loaded disk; a step of controlling according to the result of determination so as to rotate the disk at a constant angular velocity or at a constant linear velocity; and a step of executing recording in a state in which the disk is rotated.

The foregoing object is achieved in a yet further aspect of the present invention through the provision of a recording method including a recording-type detecting step of detecting the type of recording of data recorded into a disk; a step of controlling according to the type of recording used for the disk so as to rotate the disk at a constant angular velocity or at a constant linear velocity; and a step of executing recording for the disk in a state in which the disk is rotated.

The foregoing object is achieved in an additional aspect of the present invention through the provision of a recording method including a step of reading from a loaded disk substituted-area-identification information indicating whether the disk is provided with a substituted area; a step of rotating the disk at a constant angular velocity or at a constant linear velocity according to the substituted-area-identification information; and a step of executing recording for the disk in a state in which the disk is rotated.

The foregoing object is achieved in a still additional aspect of the present invention through the provision of a recording method including a determination step of determining whether initialization is required for a loaded disk, when a recording command is input from the outside; and a control step of controlling according to the result of determination performed in the determination step, so as to rotate the disk at a constant angular velocity or at a constant linear velocity.

The foregoing object is achieved in a yet additional aspect of the present invention through the provision of a recording method including a step of reading from a loaded disk recording-start-position information for the disk; a step of controlling according to the recording-start-position information so as to rotate the disk at a constant angular velocity or at a constant linear velocity; and a step of executing recording for the disk in a state in which the disk is rotated.

Since the present invention employs the foregoing structures to allow CAV control and CLV control to be selected according to whether priority is given to a data transmission rate or to an access time during data recording and initialization, a reduction in access time and a reduction in data transmission rate are suppressed during recording.

BRIEF DESCRIPTION OF THE DRAWINGS

FIG. 2 is a view showing the frame structure of a disk according to the embodiment.

FIG. 3A is a view showing a sub-coding frame of the disk according to the embodiment, and FIG. 3B is a view showing the structure of Q-channel data.

FIG. 7 is a flowchart of example processing for performing recording control according to the determination of the type of a rewritable disk.

FIG. 8 is a view showing an example structure of a UDF bridge volume.

FIG. 11 is a view showing an example track descriptor block.

FIG. 12 is a flowchart of example processing for performing recording control according to a recording state.

FIG. 16 is a flowchart showing example processing for performing recording control according to a recording start position.

DESCRIPTION OF THE PREFERRED EMBODIMENTS

Figure 1:
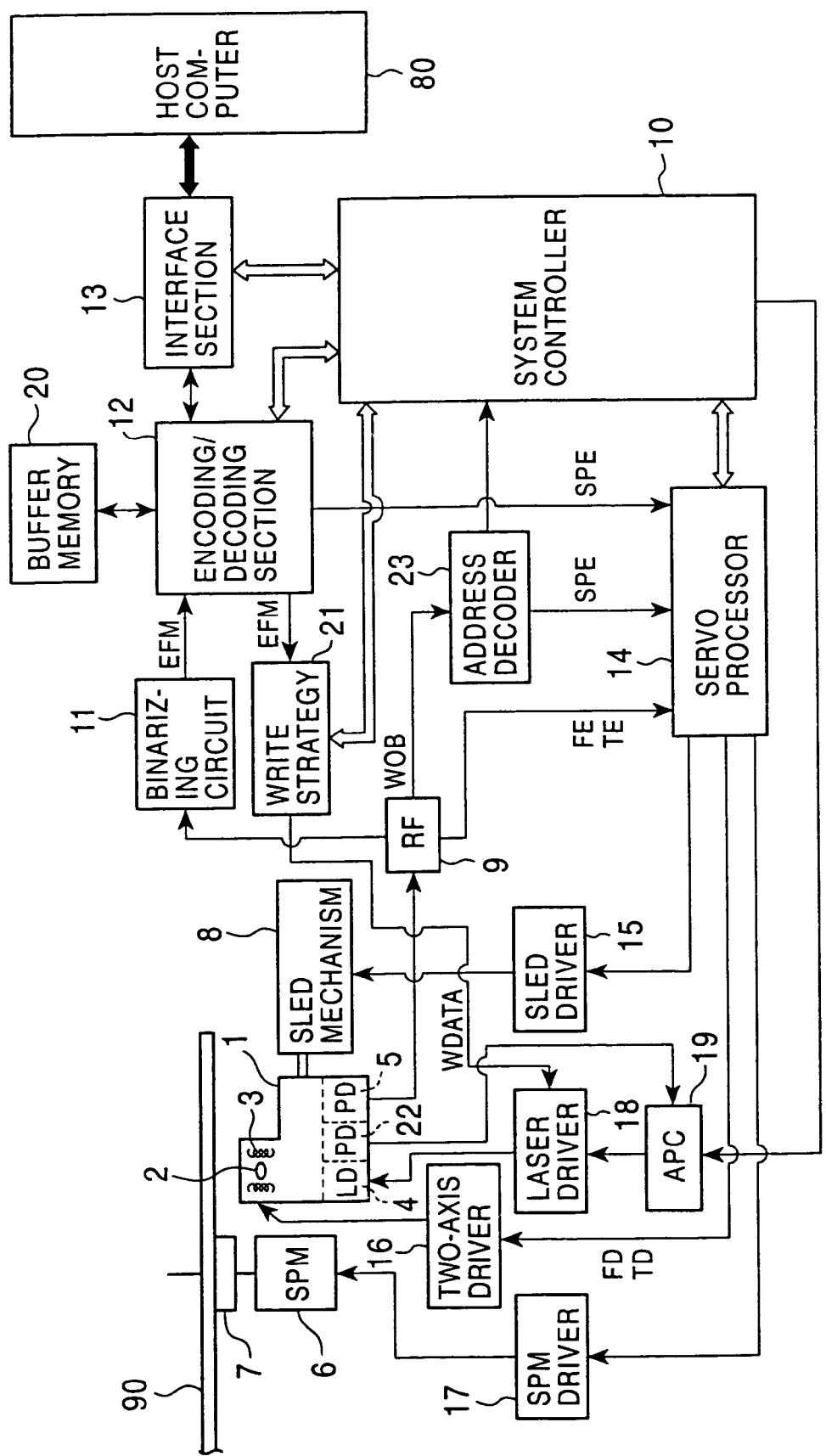
FIG. 1 is a block diagram of a recording apparatus according to an embodiment of the present invention.

A disk drive apparatus (recording and reproduction apparatus) which can handle recordable disks, such as CD-Rs and CD-RWs, and a disc-shaped recording medium will be described below as embodiments of the present invention in the following order.

1. Structure of disk drive apparatus
2. Sub-code and TOC
3. Outline of CD format
   3-1. Rewritable disks
   3-2. Recording-area format
4. Driving control based on disk reflectivity
5. Driving control based on whether random recording is allowed or not
6. Driving control based on a recording format
7. Driving control based on whether an alternative area is provided or not
8. Driving control based on whether initialization is performed or not
9. Driving control based on a recording-start radial position 1. Structure of Disk Drive Apparatus CD-Rs are write-once-type media using organic pigment in a recording layer. CD-RWs are media using a phase-change technology to allow data to be rewritable.

The structure of a disk drive apparatus having a capability of recording and reproducing data into and from CD-type disks, such as CD-Rs and CD-RWs, according to a present embodiment will be described by referring to FIG. 1.

In FIG. 1, a disk 90 is a CD-R or a CD-RW. Data can also be read from read-only disks, such as CD-digital audios (CD-DAs) and CD-ROMs, when they are used as the disk 90 in the disk drive apparatus.

The disk 90 is placed on a turntable 7, and rotated by a spindle motor 6 at a constant linear velocity (CLV) or at a constant angular velocity (CAV) during a recording or reproduction operation. An optical pickup 1 reads pit data (pits formed by phase changes, or pits formed by organic-pigment changes (reflectivity changes)) on the disk 90. In CD-DAs and CD-ROMs, pits mean embossed pits.

The pickup 1 includes a laser diode 4 serving as a laser light source, a photo-detector 5 for detecting reflected light, an objective lens 2 serving as an output end of laser light, and an optical system (not shown) for illuminating a disk recording plane with the laser light through the objective lens 2 and for guiding reflected light to the photo-detector 5.

A monitoring detector 22 for receiving a part of the output light of the laser diode 4 is also provided.

The objective lens 2 is held so as to be able to be moved in a tracking direction and in a focus direction by a two-axis mechanism 3.

The entire pickup 1 is able to be moved in a disk radial direction by a sled mechanism 8.

Laser emission in the laser diode 4 of the pickup 1 is driven by a driving signal (driving current) sent from a laser driver 18.

The photo-detector 5 detects the information of light reflected from the disk 90, converts it to an electric signal corresponding to the amount of the received light, and sends to an RF amplifier 9.

The RF amplifier 9 is generally provided with an AGC circuit because the amount of light reflected from the disk 90 before, during, and after data recording into the disk 90 changes more than that from CD-ROMs, and further because the reflectivity of CD-RWs is largely different from those of CD-ROMs and CD-Rs.

The RF amplifier 9 includes a current-to-voltage conversion circuit and a matrix-calculation and amplification circuit for the current output from a plurality of light-receiving elements serving as the photo-detector 5, and generates required signals by matrix calculation processing. The RF amplifier 9 generates, for example, an RF signal, which is reproduced data, and a focus-error signal FE and a tracking-error signal TE used for servo control.

The reproduced RF signal output from the RF amplifier 9 is sent to a binarizing circuit 11, and the focus-error signal FE and the tracking-error signal TE are sent to a servo processor 14.

On the disk 90, which is a CD-R or a CD-RW, a groove is formed in advance serving as a guide for a recording track. The groove is wobbled by a signal obtained by frequency-modulating time information indicating absolute addresses on the disk. Therefore, in a recording operation, tracking servo can be applied by using groove information, and absolute addresses can be obtained from the wobbling information of the groove. The RF amplifier 9 extracts the wobbling information WOB by matrix calculation processing, and sends it to an address decoder 23.

The address decoder 23 demodulates the sent wobbling information WOB to obtain absolute-address information, and sends it to a system controller 10.

The groove information is also sent to a PLL circuit to obtain the rotation-speed information of the spindle motor 6. The rotation-speed information is compared with reference-speed information to generate and output a spindle-error signal SPE.

The binarizing circuit 11 binarizes the reproduced RF signal obtained by the RF amplifier 9 to obtain a so-called EFM signal (8-14 modulation signal), and sends it to an encoding/decoding section 12.

The encoding/decoding section 12 includes a functional part serving as a reproduction decoder and a functional part serving as a recording encoder.

In reproduction, decoding processing, such as EFM demodulation, CIRC error correction, deinterleaving, and CD-ROM decoding, is executed to obtain reproduced data which has been converted to CD-ROM-format data.

The encoding/decoding section 12 also applies sub-code extraction processing to data read from the disk 90 to send a TOC and address information, which are sub codes (Q data), to the system controller 10.

In addition, the encoding/decoding section 12 generates a reproduction clock synchronized with the EFM signal by PLL processing, and executes the above-described decoding processing by using the reproduction clock. The rotation-speed information of the spindle motor 6 is obtained from the reproduction clock. The rotation-speed information is compared with the reference-speed information to generate and output a spindle-error signal SPE.

The encoding/decoding section 12 accumulates data decoded in the above-described way in a buffer memory 20 during reproduction.

The data buffered in the buffer memory 20 is read and output as the reproduction output of the disk drive apparatus.

An interface section 13 is connected to an external host computer 80, and transmits and receives recording data, reproduced data, and various commands to and from the host computer 80. A SCSI interface or an ATAPI interface is actually employed. During reproduction, reproduced data decoded and stored in the buffer memory 20 is output to the host computer 80 through the interface section 13.

Signals sent from the host computer 80, such as a read command and a write command, are sent to the system controller 10 through the interface section 13.

Recording data (such as audio data and CD-ROM data) is sent from the host computer 80 during recording. The recording data is sent to the buffer memory 20 through the interface 13 and buffered there.

In this case, the encoding/decoding section 12 applies encoding processing to the buffered recording data, such as encoding processing to change CD-ROM-format data to CD-format data (when the sent data is CD-ROM data), CIRC encoding and interleaving, sub-code addition, and EFM demodulation.

A write strategy 21 applies waveform adjusting processing to the EFM signal obtained by the encoding processing executed in the encoding/decoding section 12, and then, sends it to the laser driver 18 as a laser driving pulse (write data WDATA).

The write strategy 21 performs recording compensation, namely, the fine adjustment of the most appropriate recording power in terms of recording-layer characteristics, the spot shape of laser light, and a recording linear velocity.

The laser driver 18 sends the laser driving pulse received as the write data WDATA to the laser diode 4 to execute laser-light-emission driving. With this operation, pits (such as phase-change pits and pigment-change pits) corresponding to the EFM signal are formed on the disk 90.

An automatic-power-control (APC) circuit 19 is a circuit section for controlling a laser output so as to be constant irrespective of the temperature and other factors while monitoring the laser output power by the output of the monitoring detector 22. The APC circuit controls the laser driver 18 such that the laser output level matches a target laser output level given from the system controller 10.

A servo processor 14 generates various servo driving signals, such as a focus driving signal, a tracking driving signal, a sled driving signal, and a spindle driving signal, from the focus-error signal FE and the tracking-error signal TE sent from the RF amplifier 9 and the spindle-error signal SPE sent from the encoding/decoding section 12 or the address decoder 20 to execute a servo operation.

More specifically, the focus driving signal FD and the tracking driving signal TD are generated from the focus-error signal FE and the tracking-error signal TE, and are sent to the two-axis driver 16. The two-axis driver 16 drives a focus coil and a tracking coil in the two-axis mechanism 3 of the pickup 1. With this operation, a tracking servo loop and a focus servo loop are formed by the pickup 1, the RF amplifier 9, the servo processor 14, the two-axis driver 16, and the two-axis mechanism 3.

In response to a track jump instruction sent from the system controller 10, the tracking servo loop is turned off. A jump driving signal is output to the two-axis driver 16 to execute a track jump operation.

The servo processor 14 also sends a spindle driving signal generated according to the spindle error signal SPE, to a spindle-motor driver 17. The spindle-motor driver 17, for example, applies a three-phase driving signal to the spindle motor 6 according to the spindle driving signal to achieve the CLV rotation or the CAV rotation of the spindle motor 6. The servo processor 14 also generates a spindle driving signal according to a spindle kick/brake control signal sent from the system controller 10 to make the spindle-motor driver 17 operate (such as start, stop, accelerate, or decelerate) the spindle motor 6.

The servo processor 14 further generates a sled driving signal according to a sled error signal obtained as a lower-frequency component of the tracking error signal TE and according to access execution control operated by the system controller 10, and sends it to a sled driver 15. The sled driver 15 drives the sled mechanism 8 according to the sled driving signal. The sled mechanism 8 includes a main shaft for holding the pickup 1, a sled motor, and a transmission gear (none of them shown). The sled driver 15 drives the sled motor 8 according to the sled driving signal to achieve a predetermined slide movement of the pickup 1.

The system controller 10, formed of a microcomputer, controls various operations, described above, in the servo system and in the recording and reproduction system.

The system controller 10 executes various processes according to commands sent from the host computer 80.

When the host computer 80 sends a read command for requesting the transmission of data recorded in the disk 90, for example, seek operation control is first achieved with a specified address being set to the target. More specifically, the system controller 10 sends an instruction to the servo processor 14 to make the pickup 1 achieve an access operation with the address specified by a seek command being set to the target.

Then, operation control required for sending data disposed in a specified data zone to the host computer 80 is performed. Specifically, the data is read from the disk 90, decoded, buffered, and sent.

When the host computer 80 sends a write command, the system controller 10 first moves the pickup 1 to an address (next writable address) where data is to be written. Then, the system controller 10 makes the encoding/decoding section 12 apply encoding processing, described above, to data transmitted from the host computer 80 to change it to an EFM signal.

As described above, write data WDATA is sent from the write strategy 21 to the laser driver 18 to execute recording.

2. Sub-code and TOC

A TOC and a sub-code recorded into a lead-in area of a CD-format disk will be described below.

In a CD-format disk, the minimum unit of recorded data is called a frame. One block is formed of 98 frames.

FIG. 2 shows the structure of a frame.

One frame is formed of 588 bits. The first 24 bits indicate synchronization data, the following 14 bits indicate a sub-code data, and data and parity are disposed thereafter.

98 frames each having this structure constitute one block. Sub-code data extracted from 98 frames is collected to form one-block sub-code data (sub-coding frame) like that shown in FIG. 3A.

Sub-code data extracted from the first and second frames (frame $98n+1$ and frame $98n+2$) of the 98 frames serve as synchronization patterns. Channel data each having 96 bits, in other words, P, Q, R, S, T, U, V, and W sub-code data, is formed from the third frame to the 98-th frame (frame $98n+3$ to frame $98n+98$).

The P channel and Q channel are used for access management and other management. The P channel only indicates pause sections between tracks, and the Q channel is used for more-detailed control. FIG. 3B shows the structure of the Q channel data having 96 bits.

Four bits Q1 to Q4 are control data, and used for determining the number of audio channels, emphasis, CD-ROM, and whether digital copy is allowed or not.

The next four bits Q5 to Q8 are ADR, and used to indicate the mode of sub-Q data.

72 bits Q9 to Q80 following the ADR is sub-Q data, and the remaining Q81 to Q96 is CRC.

3. Outline of CD Format
   3-1. Rewritable Disks

In recordable disks such as CD-Rs and CD-RWs, only a laser-light guiding groove is formed on the substrate before recording. When the disk is illuminated with laser light which is data-modulated by a high power, the reflectivity of a recording film changes. With this principle, data is recorded.

A recording film which allows recording only once is formed on CD-Rs. This recording film is made from organic pigment. A high power laser is used to achieve drilling recording.

A recording film which allows multiple-times rewriting is formed on CD-RWs. Phase-change recording is employed. Data is recorded as a reflectivity difference between a crystalline state and a non-crystalline state.

Since reproduction-only CDs and CD-Rs have a reflectivity of 0.7 or more and CD-RWs have that of about 0.2 due to physical characteristics, reproduction apparatuses designed for disks having a reflectivity of 0.7 or more cannot reproduce data from CD-RWS. Therefore, an automatic-gain-control (AGC) function for amplifying weak signals is added to allow reproduction.

In CD-ROMs, the lead-in area is disposed at an inner-periphery area having radii of 46 mm to 50 mm, and no bit is disposed more inside the lead-in area.

Figure 4:
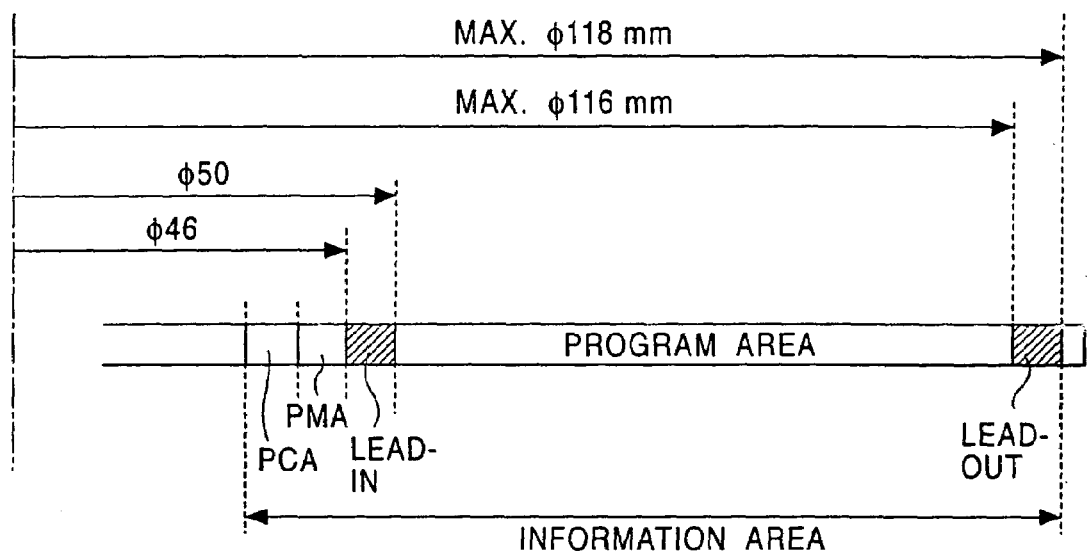
FIG. 4 is a view showing a disk layout.

As shown in FIG. 4, in CD-Rs and CD-RWs, a program memory area (PMA) and a power calibration area (PCA) are formed at the inner-periphery side of the lead-in area.

Drive apparatuses which can handle CD-Rs and CD-RWs record data in the lead-in area and in the program area following the lead-in area, used for recording actual data, and reproduce recorded contents in the same way as for CD-DAs.

The PMA temporarily stores the mode of a recording signal, and start-and-end-time information every time data is recorded into a track. After data has been recorded into all tracks to be used, a table of contents (TOC) is formed in the lead-in area according to the information.

The PCA is used for writing data on trial in order to obtain the most appropriate laser power value for recording.

On CD-Rs and CD-RWs, a groove (guiding groove) constituting a data track is formed in a wobbling manner in order to control a recording position and spindle rotation.

The groove is wobbled according to a signal modulated by information such as an absolute address, and therefore includes the information such as the absolute address. The absolute-time information represented by the wobbled groove is called an absolute time in pregroove (ATIP).

Figure 5:
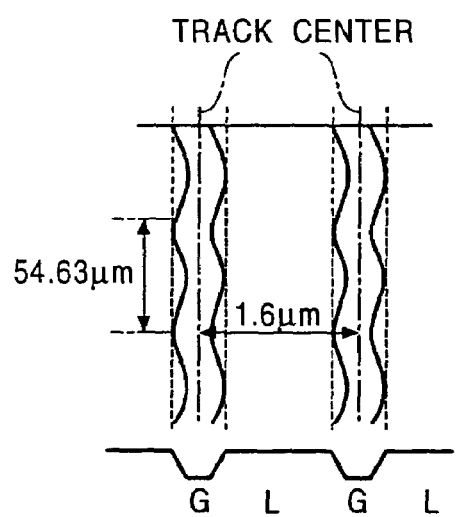
FIG. 5 is a view showing wobbling grooves.

The wobbled groove is meandered in a slightly sine-wave manner as shown in FIG. 5. Its central frequency is 22.05 kHz and the amount of wobbling is about ±0.03 $\mu$m.

The following pieces of information is encoded by FM modulation in the wobbled groove.

Time-axis Information

This time-axis signal is called ATIP, increases monotonously toward the outer periphery of the disk from the beginning of the program area, and is recorded and used for address control for data recording.

Recommended Recording Laser Power

This is the recommended value of the manufacturer. Since the most appropriate power actually changes according to various conditions, a process for determining the most appropriate recording power before recording is provided. This process is called optimum power control (OPC).

Usage of Disk

This is called an application code. The following items apply.

Restricted Use

General purpose: For general business

Special purpose: For special cases (such as for photo CDs and "karaoke" CDs)

Unrestricted Use: For Commercial Audio 3-2. Recording-area Format

A format which the disk drive apparatus uses to record data into a recording area of a recordable optical disk will be described below.

Figure 6:
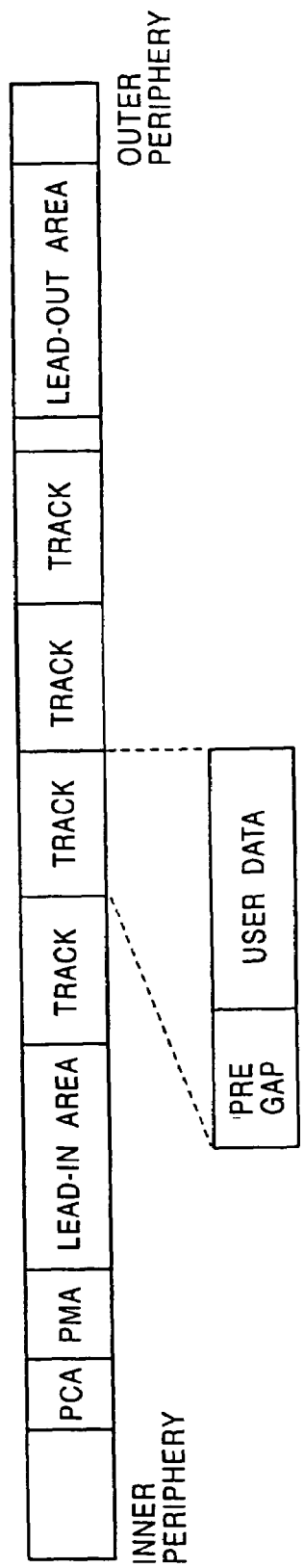
FIG. 6 is a view showing a recording-area format.

FIG. 6 is a view showing the format of the recording area of a recordable optical disk.

The disk drive apparatus formats the disk so as to form a power calibration area (PCA), an intermediate recording area (program memory area, PMA), a lead-in area, one or a plurality of tracks, and a lead-out area in that order from the inner periphery.

When user data is recorded, for example, by the packet-write method, each track is divided into a plurality of packets and recording is performed for each packet.

The PCA shown in FIG. 6 is used for test recording for adjusting a laser-light output power. When a CD-RW is used as the disk 90, a test area and a count area, for example, are formed in the PCA. When the disk drive apparatus 0 records data into the disk 90 for the first time, OPC is performed in the PCA. A recording power obtained in OPC is specified as the most appropriate recording power used for recording into the disk 90.

Each track records user data.

The lead-in area and the lead-out area record table-of-contents (TOC) information, such as the start address and the end address of a track, and various pieces of information related to the optical disk. The next writable address, which corresponds to the starting position for the next recording, is also managed in the lead-in area and the lead-out area.

The PMA records the table-of-contents information of a track for temporary storage.

Each track is formed of a pre gap for recording track information and a user-data area for recording user data.

4. Driving Control Based on Disk Reflectivity

As described above, CD-Rs and CD-RWs have different reflectivities due to their physical characteristics. Therefore, by selecting CLV control or CAV control according to the reflectivity detected before data recording, efficient recording is performed.

For CD-Rs, which are recordable, for example, CLV control is performed since sequential-access recording is more appropriate than random-access recording. For CD-RWs, which are rewritable, CAV control is performed since random-access recording is appropriate.

FIG. 7 is a flowchart of example processing for applying driving control to a disk by determining the type (recordable or rewritable) of the disk according to its reflectivity.

When it is determined in step S101 that the host computer 80 sends a write command, the processing proceeds to recording (S102). Laser light is emitted to the disk 90, and a process for proceeding to a recording operation, such as OPC is performed.

When a recording start process is performed, receiving of data sent, for example, from the host computer 80 is started (S103). The amount (reflectivity) of light reflected from the disk 90 is detected (S104), and it is determined whether the loaded disk 90 is recordable (CD-R) or rewritable (CD-RW) (S105). This determination is performed according to the condition that the reflectivity of CD-Rs is 0.7 or more and that of CD-RWs is about 0.2, as described before.

When is it determined in step S105 that the disk 90 is a rewritable disk, the disk 90 is rotated by CAV control (S106) to start writing data (S107). When is it determined in step S105 that the disk 90 is not a rewritable disk but a recordable disk, the disk 90 is rotated by CLV control (S108) to start writing data (S107).

When writing data is started, it is determined whether writing has been finished (S109). When it is determined that writing has been finished, recording started in step S102 is terminated (S110).

As described above, the type (recordable/rewritable) of the disk is determined, for example, according to the reflectivity and rotation driving is controlled, so that recording suited to the characteristics of the disk is performed. Therefore, data recording is allowed such that an access time or a data transmission rate is not reduced for each disk.

5. Driving Control Based on Whether Random Recording is Allowed or not

As described above, CD-RWs, which are rewritable, are disks suited to random recording. A case will be described next in which it is determined, for example, according to a file system whether random recording is performed, and rotation driving control is performed for a disk.

Example determination data in a file system will be described first.

FIG. 8 shows an example volume structure of a universal disc format bridge (UDF), which is a file system employed for disks such as CD-RWs and DVDs. The UDF bridge is a file system having a compatibility, to some extent, with the ISO 9660 file system, and has the same contents as the ISO 9660 file system in LBA "0" to LBA "20."

When a CD-R conforms to ISO 9660, for example, a primary volume descriptor (PVD) is written in LBA "16" and information indicating the nature of an application recorded into the disk is specified as the PVD information.

In a CD-RW employing the UDF bridge, LBA "256" indicates an anchor volume descriptor pointer as shown in FIG. 8, and an address where a PVD of the UDF is specified is recorded therein.

Therefore, To determine whether the file system employed in the disk 90 is ISO 9600 or the UDF bridge, it is necessary to use the information specified in LBA "16" and LBA "256" as type-identification information to determine the type of the disk.

Figure 9:
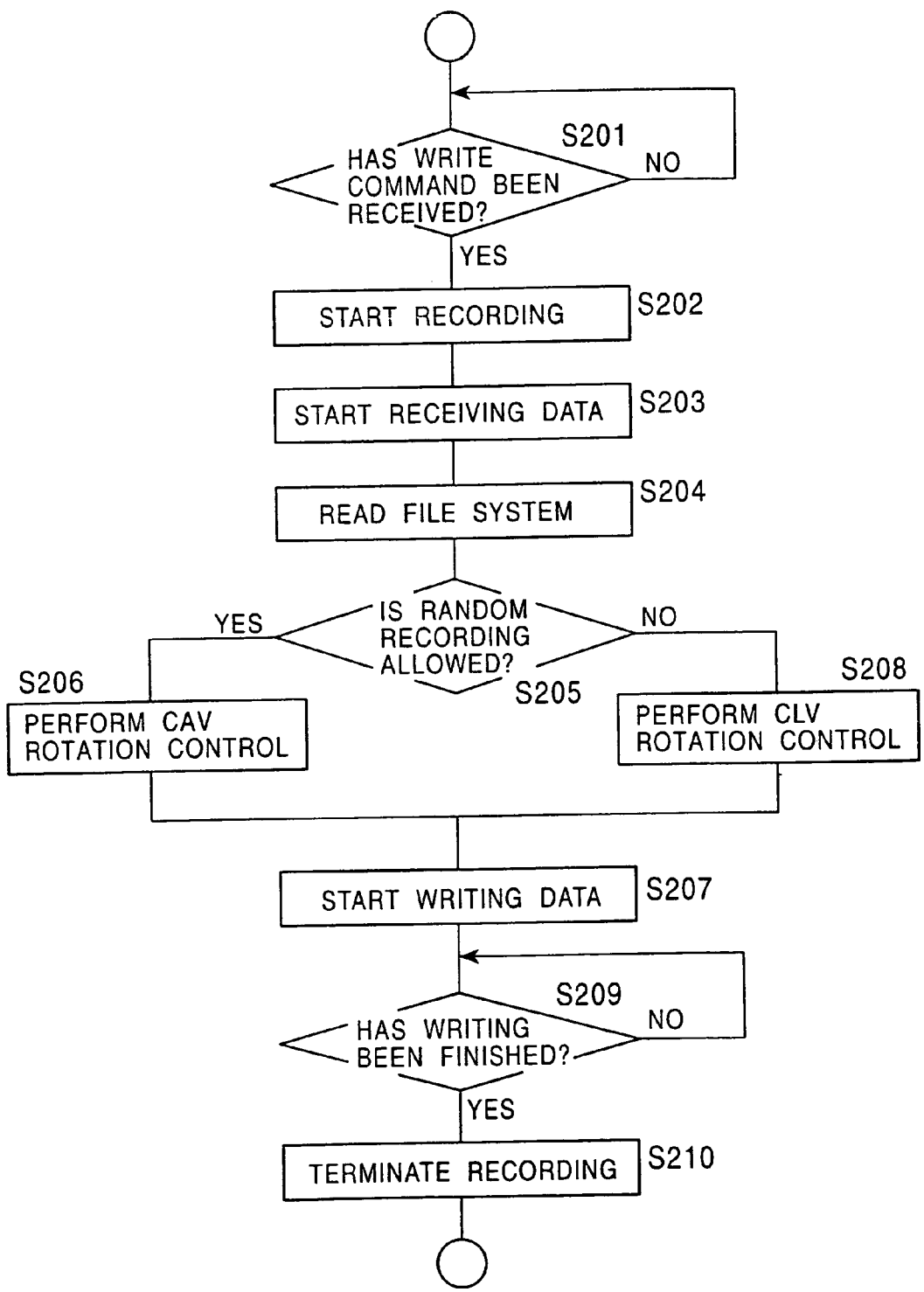
FIG. 9 is a flowchart of example processing for performing recording control according to whether random recording is allowed.

FIG. 9 is a flowchart of example processing for applying rotation driving control by determining according to the file system whether random recording is allowed or not.

The same processes are used in step S201 to step S203 as in step S101 to step S103. Specifically, receiving of recording data is started in response to a recording request sent, from example, from the host computer 80.

The file system shown in FIG. 8 is read from a predetermined position in the disk 90 (S204), and it is determined according to the information specified in LBA "16" and LBA "256" of the UDF bridge whether random recording is suited to the loaded disk or not (S205).

When it is determined in step S205 that random recording is allowed in the disk 90, the disk 90 is rotated by CAV control (S206) to start writing data (S207). When it is determined in step S205 that the disk is not a rewritable disk but a recordable disk, the disk 90 is rotated by CLV control (S208) to start writing data (S207).

When writing data is started, it is determined whether writing has been finished (S209). When it is determined that writing has been finished, recording started in step S202 is terminated (S210).

With this processing, recording is performed in disks suited to random recording, such as CD-RWS, by CAV control, which is suited to random access. Recording is performed in disks not suited to random recording, such as CD-Rs, which are recordable, by CLV control, which has an efficient data transmission rate.

It is also possible to determine, for example, according to the reflectivity of the disk 90 whether the disk is suited to random recording, in the same way as described by referring to FIG. 7.

6. Driving Control Based on a Recording Format

A case will be described next in which it is determined whether a track is closed in a disk into which data has already been recorded and data is to be further recorded, and rotation driving control is performed according to whether packets to be further recorded are of a fixed-length type or a variable-length type.

A data recording method for the disk 90 will be first described by referring to FIG. 10.

Figure 10A:
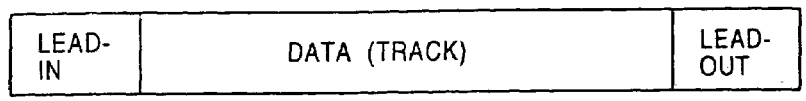
FIG. 10A to FIG. 10E are views showing track recording methods.

In a recording method called disk at once shown in FIG. 10A, a lead-in area indicating information such as a data-recording start position, data (track), and a lead-out area indicating information such as a data-recording end position are recorded at once.

Figure 10B:
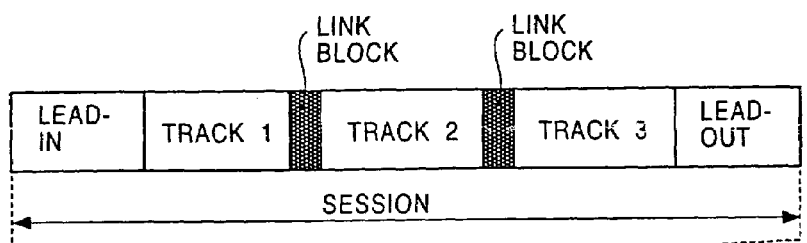

In a recording method called track at once shown in FIG. 10B, data is recorded in units of tracks. When data has been recorded in units of tracks, a lead-in area into which information such as a track writing-start position is recorded is formed before the track, and a lead-out area into which information such as a track writing-end position is recorded is formed after the track. The lead-in area, the track, and the lead-out area, which have been formed in this way, constitute a session. After track recording is finished, the lead-in area and the lead-out area are formed to close the session. In other words, the track is closed when the session is closed.

In the track-at-once recording method, a plurality of tracks can be formed between the lead-in area and the lead-out area. In this case, a joint called a link block is formed between tracks. In the track-at-once recording method, a plurality of sessions can be formed as session #1 and session #2, as show in FIG. 10C.

Figure 10C:
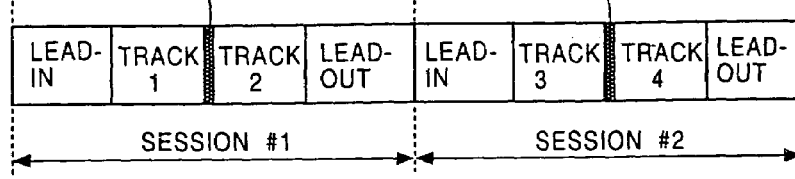
Figure 10D:
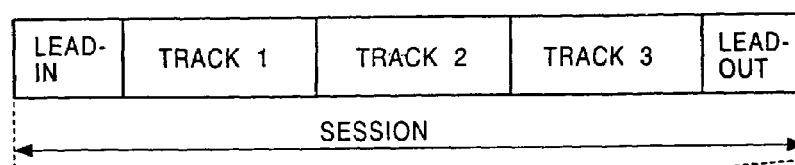
Figure 10E:
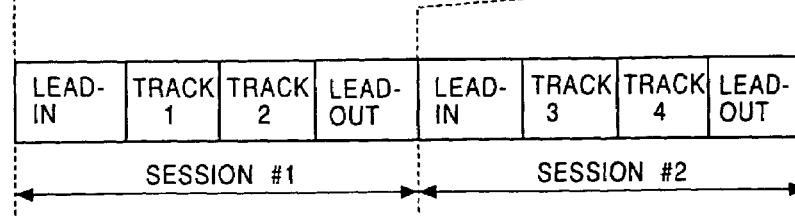

In a recording method called session at once shown in FIG. 10D, recording is performed in units of sessions. Therefore, even when a plurality of tracks are formed between the lead-in area and the lead-out area, link blocks shown in FIGS. 10B and 10C are not formed. Also in the session-at-once recording method, a plurality of sessions can be formed as session #1 and session #2, as shown in FIG. 10E.

When track recording is performed in this way, a packet-write method, in which data is recorded in units of packets, is, for example, employed.

The packet-write method includes fixed-length packet recording, in which the data length of a packet is fixed, and a variable-length packet recording, in which the data length of a packet is variable. CAV control is used in fixed-length packet recording, and CLV control is used in variable-length packet recording.

Since fixed-length packets and variable-length packets are not mixed in one track, when fixed-length packet recording is started in a track, for example, fixed-length packet recording is performed until the track is closed.

Which type of packets is used is recorded in a track descriptor table in a pre-gap disposed at the top of each track.

FIG. 11 is a view showing a track descriptor block (hereinafter called a TDB by its acronym). The TDB is recorded, for example, into a pre-gap, disposed at the top of a track.

In TDB, byte 0 to byte 7 are defined as a track descriptor table. In this track descriptor table (hereinafter called a TDT by its acronym), three bytes from byte 0 to byte 2 store 54h, 44h, and 49h to indicate track descriptor identification (TDI) by the ASCII code.

Byte 3 and byte 4 store the block number of a second portion of the pre-gap, encoded in binary coded decimal (BCD) as pre-gap length information.

Byte 6 stores lowest-track-number-listed information in the TDB, and byte 7 stores highest-track-number-listed information of the TDB.

Byte 8 and subsequent bytes are defined as a track descriptor unit.

Byte 8 stores track-number information of a content to which the track descriptor unit belongs.

Byte 9 stores information indicating the recording method used for recording the content. More specifically, when the content is recorded by the packet-write method, the method is indicated therein, and further, identification information such as whether fixed-length packets or variable-length packets are used is indicated.

Byte 10 to byte 12 indicate size information of packets in the block.

In the track descriptor block, byte 13 and subsequent bytes are not yet used.

When the TDB recorded in each track is referred to as described above, whether the track is recorded with fixed-length packets or variable-length packets is determined.

FIG. 12 is a flowchart of example processing, when data is further recorded by the track-at-once method or the session-at-once method, for applying rotation driving control to a disk at the lead-in area according to a recording-state information of, for example, whether a track is closed or not.

The same processes are used in steps S301, S302, and S303 as in step S101 to step S103.

When a recording operation has been started in response to a recording request sent from the host computer 80 and receiving data is started, it is determined whether the track is closed or not (S304). In this determination process, whether the lead-in area and the lead-out area, for example, have been formed for the track is determined. More specifically, when the lead-in area and the lead-out area have been formed, it is determined that the track is closed.

When it is determined that the track is closed, a new track is recorded. Therefore, the processing proceeds to step S305, and control is performed such that the disk is rotated by rotation driving control specified, for example, as a default in the disk drive apparatus or by rotation driving control specified by the host computer 80. Writing data is started (S306), and whether writing has been finished is determined (S308). When it is determined that writing has been finished, recording started in step S302 is terminated (S309).

When it is determined in step S304 that the track is not closed, data is further recorded into the track. In step S307, control is performed such that the disk is rotated in the same rotation driving control as in the previous recording. More specifically, it is determined, for example, according to the TDB shown in FIG. 11 whether the track is recorded with fixed-length packets or variable-length packets. Therefore, when recording is performed in the track with fixed-length packets, for example, CAV control is performed. When recording is performed with variable-length packets, CLV control is performed.

When rotation driving control is performed in this way, writing data is started (S306), it is determined whether writing has been finished (S308), and recording is terminated (S309).

Since it is determined whether the track is closed, and whether recording is performed in the track with fixed-length packets or variable-length packets is determined by referring to the TDB, rotation driving control suited to the current recording state of the disk 90 is applied for recording.

7. Driving Control Based on Whether an Alternative Area is Provided or not

Example processing for applying rotation driving control to the disk 90 according to whether an alternative area is provided for the disk into which data is recorded.

The disk 90 is checked for a defective portion when the disk is, for example, formatted or in a recording or reading operation. If a defective portion is found, required switching processing is performed to substitute another area for the defective area. Information of the defective area and the substituted area is recorded as defect management information, for example, into the lead-in area or the lead-out area of the disk 90.

To this end, the lead-in area or the lead-out area is provided with a defect management area DMA into which management information of a defective area is recorded.

When such a defective area is found, it is demanded that recording be performed with CAV control with priority being given to accessibility assuming that access processing corresponding to the defective area is performed during recording. Therefore, whether a defective area is detected is determined, and rotation driving control of the disk 90 is performed according to the result of the determination.

Figures 13A, 13B, 13C:
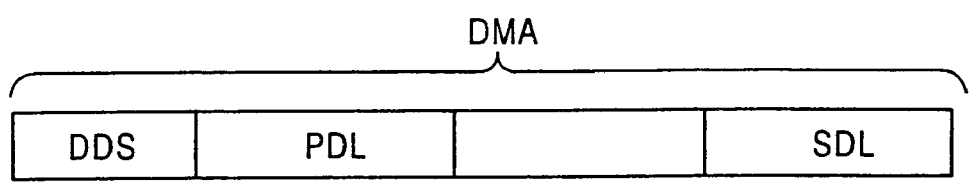
FIG. 13A to FIG. 13C are views showing an example defect management area.

The DMA includes a disk definition structure DDS, a primary defect list (PDL), and a secondary defect list (SDL) as defect management information as shown in FIG. 13A.

The disk definition structure DDS is used for managing the position where information for defect management is recorded, and stores the addresses of the primary defect list PDL, the secondary defect list (SDL), and an alternative area. More specifically, when the disk is read, the disk definition structure DDS is first read to access actual information for defect management.

The primary defect list PDL stores, as shown in FIG. 13B, the defect addresses dfaP1, dfaP2, dfaP3, . . . of found defective blocks, and also stores the number of defective blocks at the top as a PDL entry count.

The form of defect management performed with the primary defect list PDL is a form called slipping and is generated, for example, when the disk is formatted.

For defect management, the disk is checked for a defective block on the entire recording surface when the disk is manufactured or formatted.

For defective blocks found in this checking, the addresses thereof are sequentially recorded in the primary defect list PDL as defect addresses dfaP1, dfaP2, dfaP3, . . .

In this case, the block disposed immediately after a found defective block is used as the alternative block of the defective block. In other words, blocks used for recording are shifted backward as defective blocks are found, and this operation is called slipping processing.

The secondary defect list is used for managing a defective block found when the user uses the disk.

The secondary defect list SDL stores, as shown in FIG. 13C, the defect addresses dfaS1, dfaS2, dfaS3, . . . of found defective blocks, and also stores the addresses rpa1, rpa2, rpa3, . . . of alternative blocks correspondingly to the defect addresses. At the top, the number of blocks found as defective and registered is recorded as a SDL entry count.

The form of defect management performed with the secondary defect list SDL is a form called linear placement, and the contents of the list are updated (added) as a defective block is found when the user uses the disk.

More specifically, a block in a predetermined area is assigned as the alternative block of a defective block found when the user uses the disk. Therefore, in the secondary defect list, a total of 14 to 16 bytes are used as data for one found defective block, in which the defect address dfa(x) of several bytes (7 to 8 bytes) and the alternative address rpa(x) of several bytes (7 to 8 bytes) are included.

Figure 14:
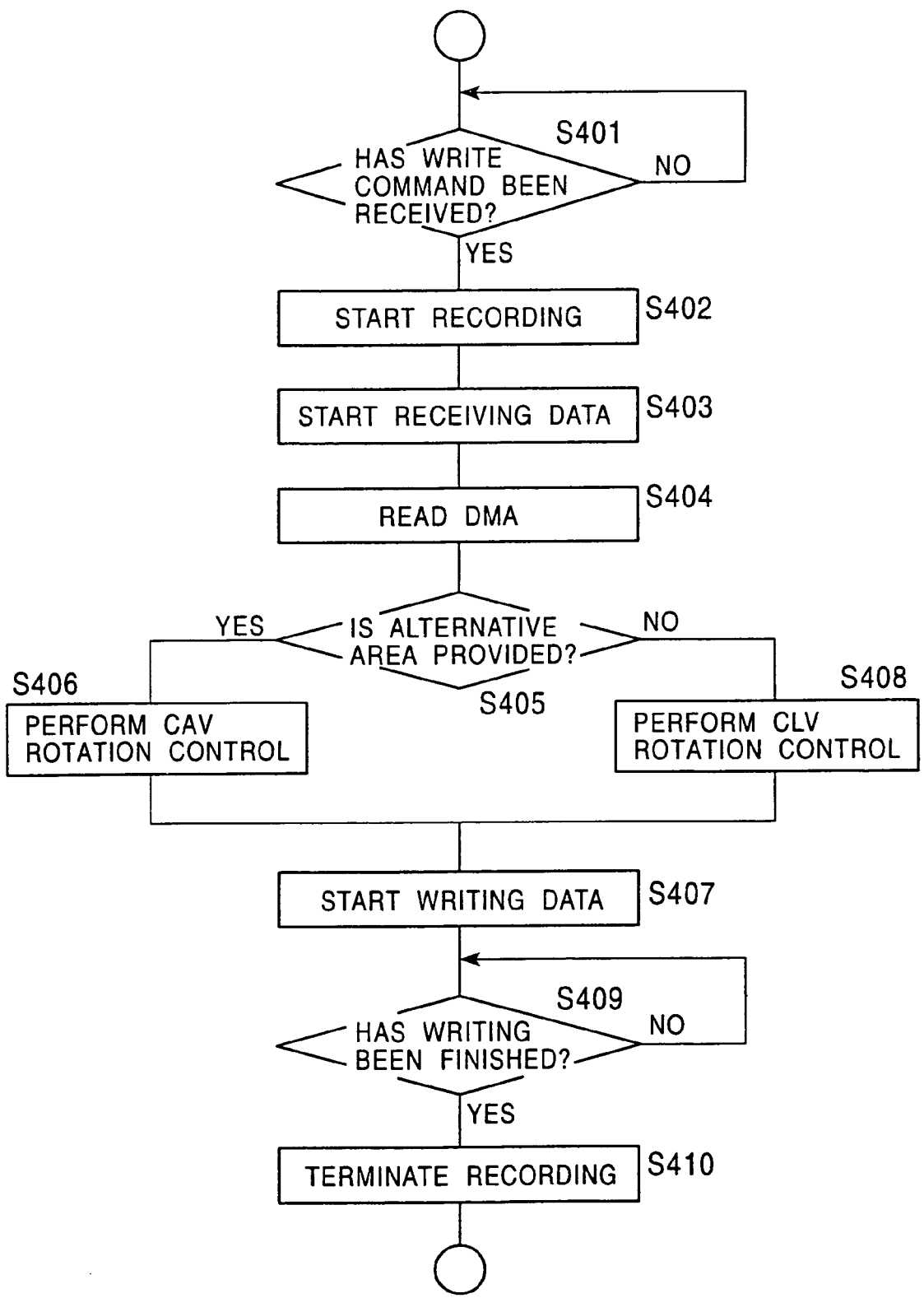
FIG. 14 is a flowchart showing example processing for performing recording control according to whether an alternative area is provided or not.

FIG. 14 is a flowchart of example processing for applying rotation driving control to the disk 90 according to whether the disk is provided with a substituted block. In FIG. 14, steps S401 to S403 correspond to steps S101 to S103, described above, and a description thereof is omitted.

When receiving data is started in step S403, the DMA formed, for example, in the lead-in area is read (S404), and it is determined whether the loaded disk has an alternative area (S405).

When it is determined in step S405 that a substituted block is used, the disk is rotated by CAV control (S406), and writing data is started (S407). When it is determined in step S405 that there is no substituted block, the disk 90 is rotated by CLV control (S408), and writing data is started (S407).

When writing data is started, it is determined whether writing has been finished (S409). When it is determined that writing has been finished, recording started at step S402 is terminated (S410).

With this operation, rotation driving is applied to a disk having a substituted block, by CAV control with priority being given to accessibility, and rotation driving is applied to a disk having no alternative area, by CLV control with priority being given to a data transmission rate.

8. Driving Control Based on Whether Initialization is Performed or not

Figure 15:
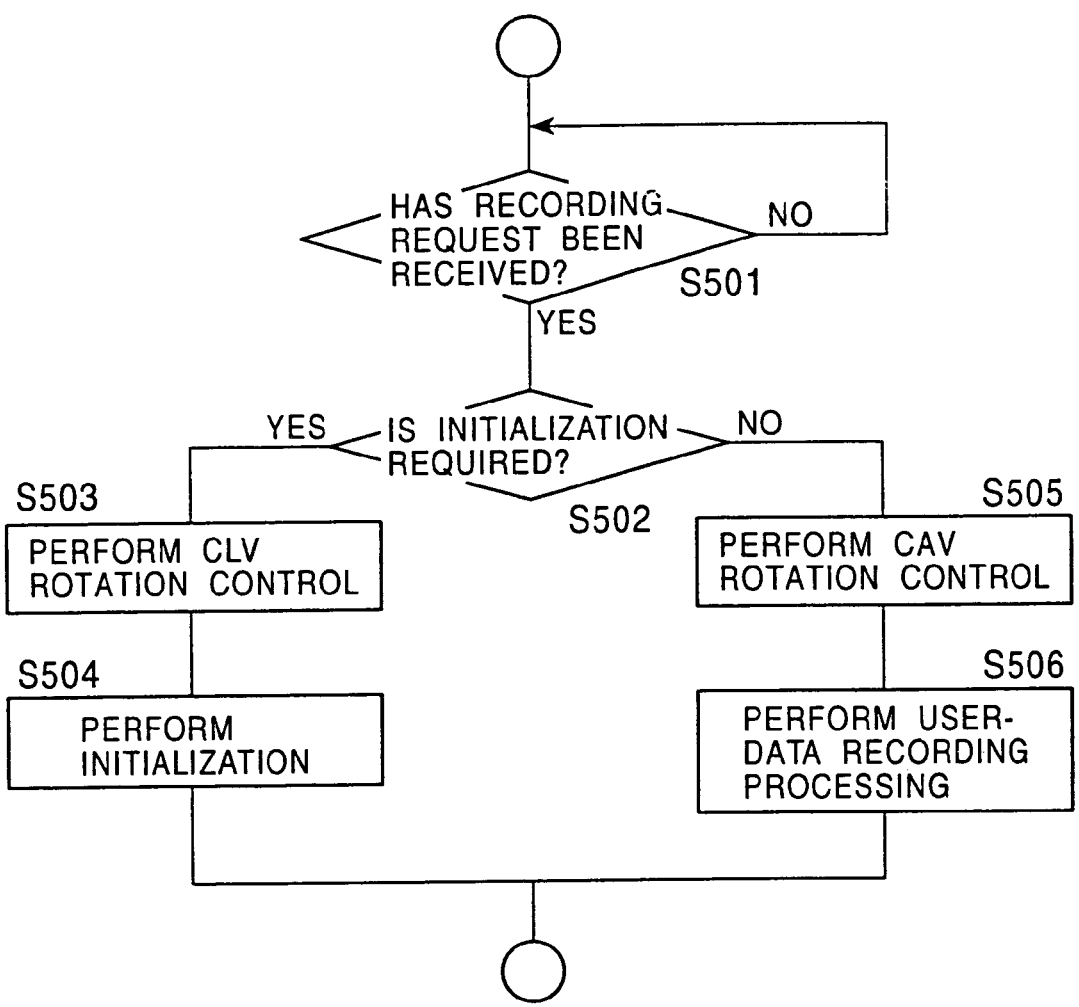
FIG. 15 is a flowchart showing example processing for performing recording control according to whether initialization is required or not.

Example processing for applying rotation driving control to the disk 90 according to whether initialization is performed for the disk will be described next by referring to a flowchart shown in FIG. 15. The initialization is a process for checking, for example, a rewritable blank disk for which recording has not yet been performed for a defective area and others to perform a switching process.

When a write command is sent from the host computer 80 (S501), for example, it is determined before recording whether initialization is required for the disk 90 (S502).

Initialization is required, for example, for a case in which the disk is rewritable (CD-RW) and is a blank disk into which data has not yet been recorded, as described above.

When it is determined that initialization is required, the disk 90 is rotated by CLV control (S503), and initialization is executed (S504). When it is determined in step S502 that initialization is not required, in other words, it is determined that the disk is a rewritable disk for which recording was performed in the past or is a recordable disk, the disk 90 is rotated by CAV control (S505), and user data is recorded (S506).

After initialization is performed in step S504, the control may be changed to CAV control to record user data.

As described above, the rotation driving control method for the disk 90 can be changed between a case in which initialization is performed and a case in which user data is recorded. Therefore, efficient initialization with priority being given to a transmission rate is allowed. Alternatively, user data can be recorded with priority being given to accessibility.

Example processing for applying rotation driving control to the disk 90 according to the radial position in the disk where recording is started will be described next.

In this case, a boundary position is set between a inner-periphery side and an outer-periphery side, for example, based on addresses on the disk 90; CLV control is achieved at the inner-periphery side of the boundary with priority being given to a data transmission rate; and CAV control is achieved at the outer-periphery side with priority being given to accessibility.

As addresses indicating positions on the disk 90, physical addresses (physical block addresses, PBA) and logical addresses (logical block addresses, LBA) are used. Continuous values are assigned to blocks from the top of the lead-in area to the end of the lead-out area as physical addresses. They are so-called absolute addresses on the disk.

Logical addresses are assigned to a user area to be accessed during usual recording and reproduction operations. The top block of the user area has a logical address of zero. In other words, the address value corresponding to the lead-in area is added to a logical address as an offset to obtain the corresponding physical address.

Therefore, for example, the LBA corresponding to the next writable address stored in the lead-in area, that is, a writing start position is determined as a radial position on the disk 90 to perform rotation driving of the disk 90.

9. Driving Control Based on a Recording-Start Radial Position

FIG. 16 is a flowchart of example processing for applying rotation driving control to the disk 90 according to the position where data recording is started. In FIG. 16, step S601 to step S603 correspond to step S101 to step S103, described above, and a description thereof will be omitted.

When receiving data is started in step S603, it is determined, for example, according to the next writable address whether the recording-start position (radial position) is located more inside than a predetermined radial position (in the inner-periphery side) or more outside than the predetermined radial position (in the outer-periphery side) in the disk 90 (S604).

When it is determined in step S604 that the recording-start position is at the outer-periphery side, the disk 90 is rotated by CAV control (S605), a strategy switching process corresponding to the outer-periphery side is performed (S606), and writing data is started (S607). When it is determined in step S604 that the recording-start position is at the inner-periphery side of the disk 90, the disk 90 is rotated by CLV control (S608), and writing data is started (S607).

When writing data is started, it is determined whether writing has been finished (S609). When it is determined that writing has been finished, recording started in step S602 is terminated (S610).

As described above, since the rotation driving control of the disk 90 is performed according to the data-writing-start position in the radial direction of the disk 90, appropriate recording control is performed at the inner-periphery side or the outer-periphery side. It is also possible that recording is started by CLV control when the data-writing-start position is located at the inner-periphery side, and the control is switched to CAV control when the recording position reaches the predetermined radial position.

Rotation driving control may be performed such that, when the disk 90 has an outside dimension (disk diameter) of 12 cm, for example, recording is performed according to the processing shown in FIG. 16, and when the disk 90 has an outside dimension of 8 cm, for example, CLV control is applied to the disk at the entire recording area. Alternatively, recording may be executed by CAV control for a disk having an outside diameter of 8 cm or more, for example, and by CLV control for a disk having an outside diameter of 8 cm or less.

As described above, the present invention allows recording to be executed by CAV control or CLV control according to the amount of reflected light obtained when laser light is emitted to the disk. In addition, type-identification information recorded into the disk is read and recording can be executed by CAV control or by CLV control according to the type-identification information.

Therefore, the type of a disk is determined, and recording is performed by servo control suited to the type of the disk.

It is determined according to recording-instruction information whether a track is closed or not. When the track is not closed, recording can be executed by CAV control or by CLV control according to packet information.

Therefore, recording is performed by servo control suited to the recording state of the disk.

Recording can also be performed by CAV control or by CLV control according to switching-identification information recorded into the disk.

Therefore, when a substituted area is used, for example, recording is performed by CAV servo control with priority being given to accessibility.

Further, CAV control or CLV control is allowed according to whether initialization or recording is performed for the disk.

Therefore, initialization is efficiently performed by CLV control with priority being given to a transmission rate. User data is also recorded with priority being given to accessibility.

Furthermore, CAV control or CLV control is allowed according to a recording-start position on the disk.

Therefore, recording control suited to the inner-periphery side or the outer-periphery side of the disk is performed.

In other words, according to a recording apparatus and recording method of the present invention, it is possible to select CAV control or CLV control according to whether priority is given to a data transmission rate or to an access time correspondingly to the type of a disk or a data recording method. Therefore, recording is performed with a reduction in an access time for a predetermined recording area and a reduction in a data transmission rate being suppressed.

What is claimed is:

1. A recording apparatus comprising:

laser-light emitting means for emitting laser light to a loaded disk;

detecting means for detecting light reflected from the loaded disk;

driving means for rotating the loaded disk;

determination means for determining a type of the loaded disk;

driving control means for controlling the driving means according to a result of determination performed by the determination means, so as to perform rotation driving at one of a constant angular velocity and at a constant linear velocity; and recording control means for executing recording for the loaded disk in a state in which the driving control means performs rotation driving control;

wherein the detecting means comprises reflected-light detecting means for detecting an amount of light reflected from the loaded disk, and the determination means determines the type of the loaded disk according to a detection output of the reflected-light detecting means, and further comprising:

an RF amplifier receiving the detection output of the reflected-light detecting means and producing an output signal fed to a servo processor for controlling a focus and tracking of the laser-light emitting means that includes an objective lens mounted to a two-axis mechanism for adjusting the focus and tracking.

* * * * *